Patented June 15, 1954

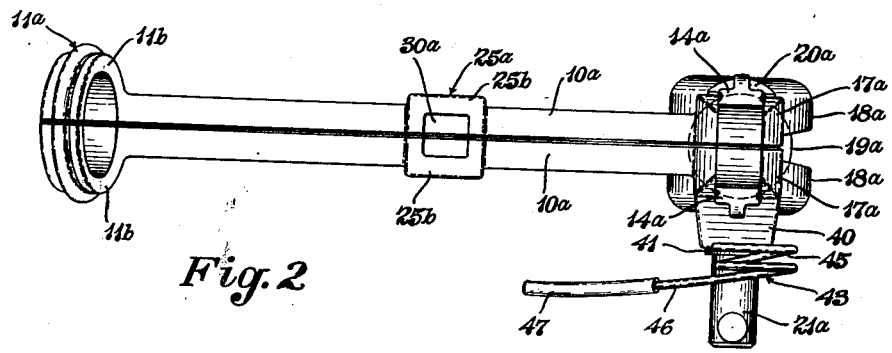
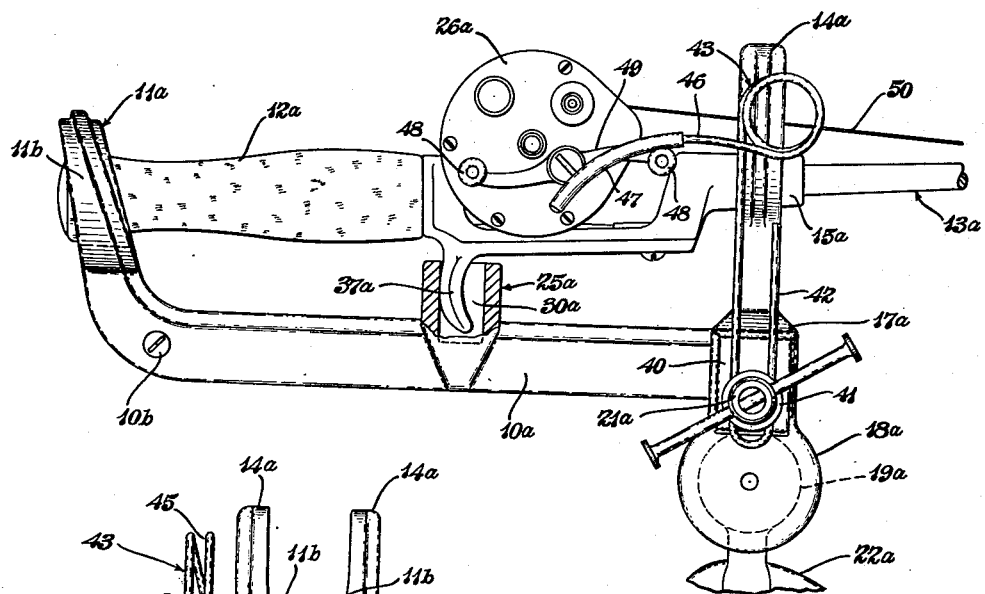
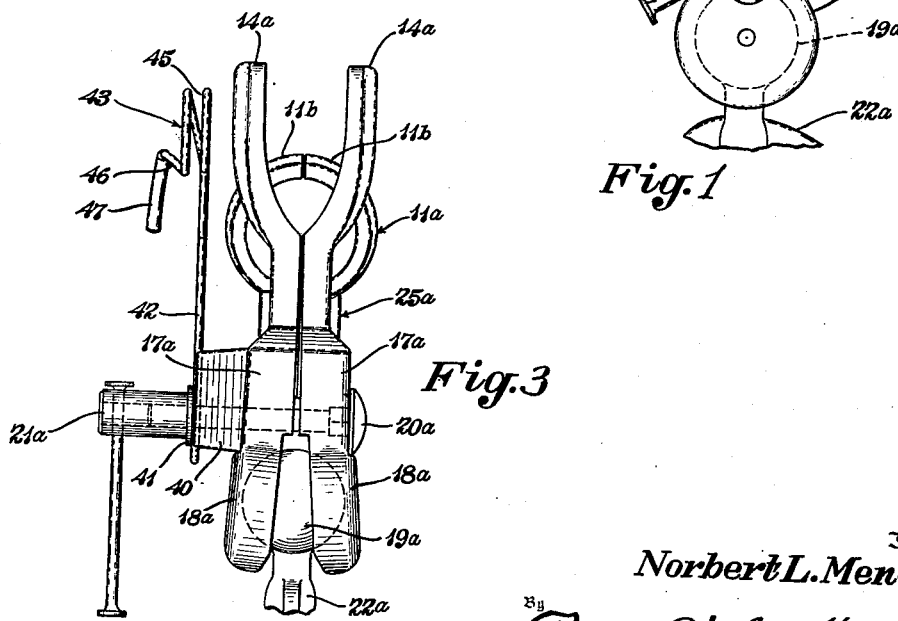

2,680,924

UNITED STATES PATENT OFFICE 2,680,924

FISHING ROD HOLDER WITH REEL REST AND DRAG

Norbert L. Menegay, Louisville, Ohio

Application February 5, 1951, Serial No. 209,483

4 Claims. (Cl. 43—21.2)

The invention relates to holders for fishing rods, and more particularly to means thereon for holding the reel of the rod in upright position and for providing a drag upon the reel to prevent rapid unwinding of the line from the reel when desired.

It is an object of the invention to provide a fishing rod holder comprising a substantially horizontal rod having an eye at one end to engage the end of the hand-grip of a fishing rod and a fork spaced from the eye to receive a portion of the rod, above the reel, and a reel rest member mounted upon the rod between the eye and fork and having a socket to receive the finger grip of the reel seat, to hold the reel in upright position.

Another object is to provide such a rod holder in which the reel rest member is provided with means for providing a drag upon the reel.

A further object is to provide such a rod holder with a drag in the form of a spring member adapted to engage the crank handle of the reel.

A still further object is to provide a rod holder of the character referred to formed of two similar clamping members adapted to be clamped together upon a support, and including a substantially horizontal rod carried thereby and carrying a socket for receiving the finger grip of the reel.

The above objects together with others which will be apparent from the drawing and following description, or which may be later referred to, may be attained by constructing the improved fishing rod holder with reel rest and drag in the manner hereinafter described in detail and illustrated in the accompanying drawing, in which:

Fig. 1 is a side elevation of a preferred embodiment of the fishing rod holder, showing a rod, with reel thereon, mounted in the holder and the spring drag applied to the crank handle of the reel;

Fig. 2 a top plan view of the rod holder shown in Fig. 1, with the rod and reel removed therefrom; and Fig. 3 an end view of the rod holder shown in Figs. 1 and 2.

Referring now to the preferred embodiment of the invention, as illustrated in the drawing, the fishing rod holder preferably comprises the two clamping members 17a, having the opposed, semispherical sockets 18a adapted to be clamped upon the ball 19a of the support 22a, as by the clamping screw 20a and nut 21a.

The fork 14a—14a is formed of two parts, each being rigidly connected to, or integrally formed upon, one of the clamping members 17a, in the manner described in detail in my prior Patent No. 2,252,639, dated May 15, 1951.

One novel feature of this preferred embodiment of the invention, is that the horizontal rod, for supporting the end of the fishing rod, is not clamped between the clamping members, as in Fig. 1, but comprises two similar halves 10a—10a, one of which is shown as formed integrally upon each clamping member 17a.

Preferably, the outer end portions of the two halves 10a—10a, of this horizontal rod, may be tightly connected together, as by a screw or bolt 10b, as best shown in Fig. 1 and an eye 11a is carried at the rear end of this horizontal rod, and, as shown in the drawings, may be formed of two similar halves 11b—11b, one of which may be formed upon the rear end of each half 10a of the horizontal rod.

The reel rest, indicated generally at 25a, is formed of two halves 25b—25b, one of which is formed integrally upon each half 10a of the horizontal rod, and has the socket 30a therein.

One of the clamping members 17a has a lug 40, formed integrally upon one side thereof, surrounding the clamping screw 20a and a washer 41 is placed around the screw, and between the clamping nut 21a and the lug 40, and is adapted to clamp the U-shaped portion 42, of the drag spring indicated generally at 43, against the end of said lug.

The drag spring 43 has one or more convolutions or coils 45 formed therein forwardly of the lug 40, and then extends rearwardly, and downwardly, as at 46, and may have a tubular covering 47, of rubber or similar resilient material thereon.

When it is desired to mount a fishing rod in the holder, the fishing rod, as indicated generally at 13a, is positioned in the holder, as shown in Fig. 1, the end portion of the hand grip 12a of the fishing rod being received in the eye 11a, the portion 15a of the fishing rod being received in the guide fork 14a—14a, the finger grip 37a, of the reel seat 16a of the rod, being received in the socket 30a of the reel rest 25a.

The rearwardly and downwardly disposed portion 46 of the drag spring is then positioned across the nearest of the two handles 48 of the crank 49, of the reel 26a, holding the rod securely in position upon the holder and placing a frictional drag upon the reel.

Depending upon the size or weight of the particular kind of fish for which the fisherman may be fishing, the drag spring 43 may be formed of spring wire of varied gauge and/or tension upon the same may be adjusted by the size and/or number of convolutions 45 therein, so as to provide any desired number of pounds of frictional drag upon the reel.

It will be seen that in this preferred embodiment of the invention, the reel is held in upright position, by engagement of the finger grip 37a in the socket 30a of the reel rest 25a, and by the frictional pressure or drag of the portion 46 of the drag spring 43 upon the reel, so that in trolling or the like the reel has sufficient frictional drag thereon that when a fish strikes the lure upon the fish line 50 the reel will not be rapidly rotated thus preventing the line from being paid out too rapidly, but at the same time providing a safety factor to prevent the line from tearing in case the lure is snagged upon a log, rock or the like.

It will also be seen that with the rod and reel held in this position upon the holder the reel may be manually manipulated by the fisherman at any time he desires and if desired the rod may be quickly and easily removed from the holder by simply disengaging the spring 46 of the drag spring from the crank handles of the reel and manually removing the reel from the holder by grasping the hand grip 12a thereof.

Although the invention is illustrated and described in connection with means for attaching it to a boat, or other supporting means, it should be understood that any suitable means may be provided for mounting the supporting rod in substantially horizontal position, the invention primarily being concerned with a reel seat mounted upon a substantially horizontal supporting rod.

I claim:

1. A fishing rod holder comprising a support member, a ball rigidly mounted upon the support member, a pair of similar clamping members having opposed sockets in their lower ends for adjustably receiving the ball, means for clamping said clamping members in adjusted position upon the ball, means at the upper ends of the clamping members forming a rest for a fishing rod, a substantially horizontal supporting bar formed of two similar halves, one of said halves being formed integrally upon each clamping member, an eye carried at the end of said horizontal supporting bar for receiving the end of a fishing rod, and a reel rest upon said bar having a vertical socket therein for receiving the finger grip of the reel seat of the fishing rod to hold the reel in upright position.

2. A fishing rod holder comprising a support member, a ball rigidly mounted upon the support member, a pair of similar clamping members having opposed sockets in their lower ends for adjustably receiving the ball, means for clamping said clamping members in adjusted position upon the ball, means at the upper ends of the clamping members forming a rest for a fishing rod, a substantially horizontal supporting bar formed of two similar halves, one of said halves being formed integrally upon each clamping member, an eye carried at the end of said horizontal supporting bar for receiving the end of a fishing rod, and a reel rest upon said bar having a vertical socket therein for receiving the finger grip of the reel seat of the fishing rod to hold the reel in upright position, said eye and said reel rest each being formed in two halves, one of which is integrally formed upon each half of the horizontal supporting bar.

3. A fishing rod holder comprising a support member, a ball rigidly mounted upon the support member, a pair of similar clamping members having opposed sockets in their lower ends for adjustably receiving the ball, means for clamping said clamping members in adjusted position upon the ball, means at the upper ends of the clamping members forming a rest for a fishing rod, a substantially horizontal supporting bar formed of two similar halves, one of said halves being formed integrally upon each clamping member, an eye carried at the end of said horizontal supporting bar for receiving the end of a fishing rod, and a reel rest upon said bar having a vertical socket therein for receiving the finger grip of the reel seat of the fishing rod to hold the reel in upright position, and a drag spring carried by said clamping means and arranged to frictionally contact the crank handles of the reel.

4. A fishing rod holder comprising a support member, a ball rigidly mounted upon the support member, a pair of similar clamping members having opposed sockets in their lower ends for adjustably receiving the ball, means for clamping said clamping members in adjusted position upon the ball, means at the upper ends of the clamping members forming a rest for a fishing rod, a supporting bar carried by the clamping members and located substantially perpendicular thereto, an eye upon the end of the supporting bar for receiving the end of a fishing rod, a reel rest upon said bar having a vertical socket therein for receiving the finger grip of the reel seat of the fishing rod, and a drag spring comprising a coil fixed to a clamping member and a downwardly curved end portion arranged to engage over the nearest crank handle of the reel and extending downwardly beyond said crank handle for placing a frictional drag upon the reel and for securely holding the fishing rod in the holder.

References Cited in the file of this patent

UNITED STATES PATENTS

| Number | Name | Date |
|---|---|---|
| 1,760,592 | Gift | May 27, 1930 |
| 2,184,583 | Danko | Dec. 26, 1939 |
| 2,473,778 | Benes | June 21, 1949 |
| 2,537,456 | Goss | Jan. 9, 1951 |
| 2,576,212 | Carter | Nov. 27, 1951 |
| 2,581,671 | Katter | Jan. 8, 1952 |
| 2,599,099 | Folker | June 3, 1952 |